No. 638,349. Patented Dec. 5, 1899.
E. H. MONTGOMERY.
ROTARY ENGINE.
(Application filed Feb. 7, 1899.)

(No Model.) 2 Sheets—Sheet 1.

Witnesses
C. F. Kilgore
Elaie W Evans

Inventor
Edwin H. Montgomery
By his Attorneys
Merwin Lothrop & Johnson

No. 638,349. Patented Dec. 5, 1899.
E. H. MONTGOMERY.
ROTARY ENGINE.
(Application filed Feb. 7, 1899.)

(No Model.) 2 Sheets—Sheet 2.

Witnesses
C. F. Kilgore
Elgie H. Evans

Inventor
Edwin H. Montgomery
By his Attorneys
Merwin Lothrop & Johnson

THE NORRIS PETERS CO., PHOTO-LITHO., WASHINGTON, D. C.

United States Patent Office.

EDWIN H. MONTGOMERY, OF ST. PAUL, MINNESOTA, ASSIGNOR OF ONE-HALF TO EDWARD B. SMITH, OF SAME PLACE, AND GRANGER SMITH, OF WAUKEGAN, ILLINOIS.

ROTARY ENGINE.

SPECIFICATION forming part of Letters Patent No. 638,349, dated December 5, 1899.

Application filed February 7, 1899. Serial No. 704,775. (No model.)

*To all whom it may concern:*

Be it known that I, EDWIN H. MONTGOMERY, of St. Paul, Ramsey county, Minnesota, have invented certain Improvements in Rotary Engines, of which the following is a specification.

My invention relates to improvements in rotary engines; and it consists in the features of construction and combination hereinafter described and claimed.

Figure 1:
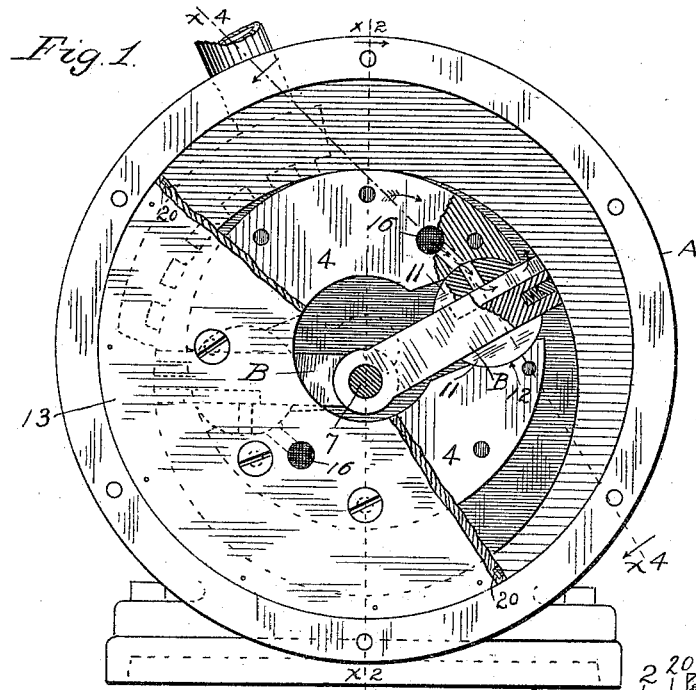
Figure 2:
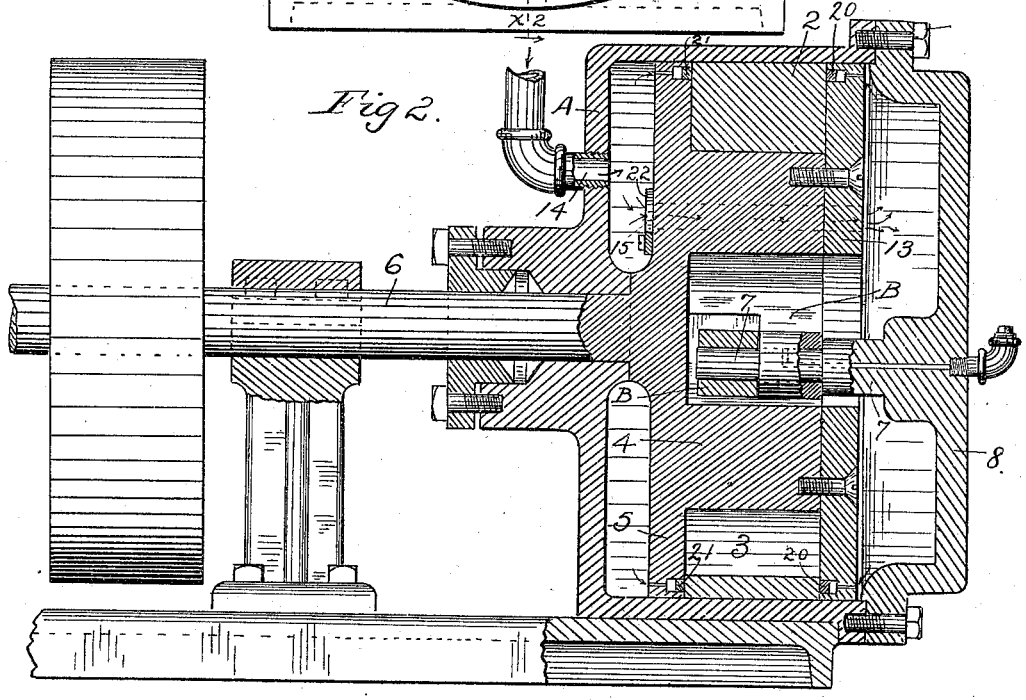
Figure 3:
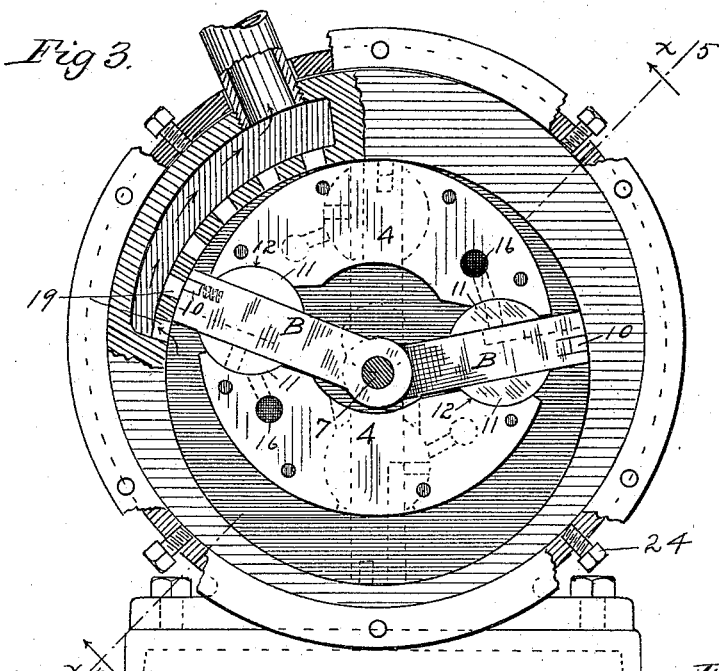
Figure 4:
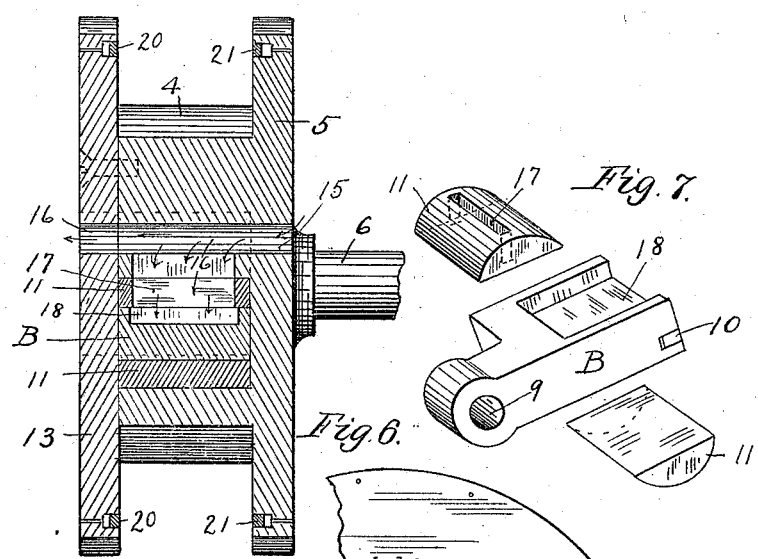
Figure 6:
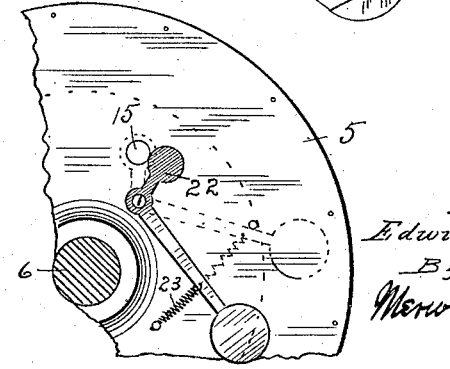
Figure 5:
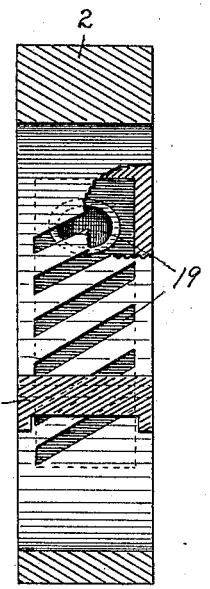

In the accompanying drawings, forming part of this specification, Figure 1 is a front elevation of my improved engine, partly broken away. Fig. 2 is a section on line $x^2 x^2$ of Fig. 1. Fig. 3 is a front elevation with the front wall of the piston-chamber removed and being partially broken away to show the exhaust-port. Fig. 4 is a section on line $x^4 x^4$ of Fig. 1 with the circular side wall of the piston-chamber and the inclosing valve-chest removed. Fig. 5 is a section on line $x^5 x^5$ of Fig. 3. Fig. 6 is a partial view of one of the end walls of the piston-chamber and attached governor, and Fig. 7 shows details of the piston-slide and trunnions.

In the drawings, A represents the steam-chest, within which the operating parts of the engine are arranged. Within the steam-chest is a fixed cylinder-wall 2, forming a piston-chamber 3. Within said piston-chamber is a piston-carrying cylinder 4, said cylinder being secured upon a rotatable disk 5, which closes one end of the piston-chamber. The piston-carrying cylinder is eccentrically arranged in the piston-chamber. This is preferably accomplished, as shown in the drawings, by having the piston-chamber eccentric with the driving-shaft 6 and mounting the piston-cylinder upon said shaft. This specific arrangement, however, is not material, and any other construction and arrangement which will cause the piston-carrying cylinder to be at all times in eccentric position in the chamber may be employed.

Working in an opening in the side of the piston-cylinder is a pair of slides B, adapted to be held in contact with the wall of the chamber to serve as pistons. These slides are held in contact with the wall by a pin 7, extending inwardly from the front wall 8 of the steam-chest and projecting into an opening 9 in the inner overlapping ends of the slides, thus serving as a pivot upon which said slides turn. Suitable packing-strips 10 are arranged in the ends of the piston-slides. A tight joint is maintained between the piston slides and cylinder by means of trunnions 11, which are arranged in recesses 12 in the cylinder and between which the piston-slides work. It will be evident that there will be a turning of the piston-slides as the cylinder is rotated, due to the eccentric arrangement of the cylinder, and this movement of the slides is permitted by the trunnions, which turn in the recesses 12. The front end of the piston-chamber is closed by the disk 13, secured to the piston-cylinder. Steam enters the steam-chest through an inlet-joint pipe 14, passing through an opening 15 in the rear wall of the piston-chamber and a registering opening 16 in the piston-cylinder to a conduit 17, extending through one of the trunnions to a port 18 in the piston-slide. The port 18 opens upon that side of the slide which is adjacent to the point where the piston-cylinder is in contact with the wall of the chamber, thus causing the steam as it issues from the port to exert pressure upon the slide and rotate the cylinder. The steam is exhausted from the piston-chamber through an exhaust-port 19, which is always open. By referring to Fig. 4 it will be seen that the conduit 15 extends entirely through the piston-cylinder and both walls of the chamber, thus permitting the steam to pass into the space adjacent the front wall of the piston-chamber to exert pressure upon the packing-rings 20 between the front wall and circular side wall of the chamber. Similar packing-rings 21 are arranged between the rear and side wall. The inlet end of the port 15 is closed by a centrifugal governor 22, said governor being normally held away from the conduit by a spring 23. The rotation of the cylinder will throw the governor into closed position. The governor can be so adjusted by means of its weight and spring as to be thrown into closed position at any desired speed of cylinder. The circular wall of the piston-chamber is adjustable by means of screws 24 to take up wear.

By referring to the drawings it will be seen that the trunnions, through which the ports 17 pass, serve as valves to control the inlet of steam. Fig. 1 shows the position of the ports as the steam is entering the piston-chamber. As the cylinder rotates the piston-slides and trunnions turn, causing the ports to reach full-open position at about quarter-stroke. The continued rotation of the cylinder turns the trunnions and piston-slides until the inlet of steam is shut off, this preferably taking place at about one-half stroke. From this point the expansion of the steam is utilized until the piston reaches the exhaust-port.

It will be evident that the trunnion 11, through which the conduit 17 extends, serves as a rotary inlet or cut-off valve and is actuated through the relative movement between piston slide and cylinder.

My construction may be used as a pump, and other source of power, as air, may be employed without departing from the idea of my invention.

I claim—

1. In a rotary engine the combination with a piston-chamber, of a rotary cylinder therein, a piston slidable in said cylinder, an interposed trunnion-valve and conduits connecting the same with an inlet-port and with the interior of the chamber.

2. In a rotary engine, the combination with a piston-chamber, of a contained rotary cylinder, a piston slidable therein, and a trunnion-valve arranged between said piston and cylinder and adapted to be brought by the rotation of said cylinder into registering position with an inlet-port and a port through the piston.

3. In a rotary engine, the combination with a piston-chamber, of a rotary cylinder eccentrically arranged therein, a piston slidable in said cylinder and actuated from a center offset from the center of said cylinder, and a trunnion cut-off valve arranged between said piston and cylinder and connected by conduits with an inlet-port and with the interior of the piston-chamber.

4. In a rotary engine, the combination with the steam-chest, of an inclosed piston-chamber, a piston-cylinder eccentrically arranged in said chamber, a piston slidable in the periphery of said cylinder and normally held in contact with the walls of the chamber, trunnions arranged between the cylinder and piston and serving as guides for the piston, one of said trunnions being formed with a conduit adapted to register with an inlet-port and a port leading through the piston, whereby said trunnion serves as a rotary cut-off valve.

In testimony whereof I affix my signature in the presence of two witnesses.

EDWIN H. MONTGOMERY.

Witnesses:
H. S. JOHNSON,
ELGIE H. EVANS.